(12) United States Patent
Mune et al.

(10) Patent No.: US 9,711,768 B2
(45) Date of Patent: Jul. 18, 2017

(54) ELECTRICITY STORAGE DEVICE

(71) Applicant: KABUSHIKI KAISHA TOYOTA JIDOSHOKKI, Kariya-shi, Aichi-ken (JP)

(72) Inventors: Shimpei Mune, Kariya (JP); Motoaki Okuda, Kariya (JP); Yushi Kondo, Kariya (JP); Hirokuni Akiyama, Kariya (JP); Hiroyasu Nishihara, Kariya (JP); Atsushi Minagata, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 260 days.

(21) Appl. No.: 14/647,268

(22) PCT Filed: Nov. 19, 2013

(86) PCT No.: PCT/JP2013/081155
§ 371 (c)(1),
(2) Date: May 26, 2015

(87) PCT Pub. No.: WO2014/084088
PCT Pub. Date: Jun. 5, 2014

(65) Prior Publication Data
US 2015/0318526 A1  Nov. 5, 2015

(30) Foreign Application Priority Data

Nov. 28, 2012 (JP) ................................. 2012-259679
Aug. 6, 2013 (JP) ................................. 2013-163354

(51) Int. Cl.
*H01M 2/12* (2006.01)
*H01M 2/04* (2006.01)
(Continued)

(52) U.S. Cl.
CPC .......... *H01M 2/1252* (2013.01); *H01G 11/18* (2013.01); *H01G 11/78* (2013.01);
(Continued)

(58) Field of Classification Search
CPC .. H01M 2/1252; H01M 2/043; H01M 2/1223; H01M 2/22; H01M 2/266;
(Continued)

(56) References Cited

U.S. PATENT DOCUMENTS

2005/0287422 A1  12/2005  Kim et al.
2006/0117701 A1   6/2006  Kajimura
(Continued)

FOREIGN PATENT DOCUMENTS

JP    2006-12831 A   1/2006
JP    2006-147422 A  6/2006
(Continued)

OTHER PUBLICATIONS

International Preliminary Report on Patentability dated Jun. 2, 2015 from the International Searching Authority in counterpart application No. PCT/JP2013/081155.

*Primary Examiner* — Raymond Alejandro
(74) *Attorney, Agent, or Firm* — Sughrue Mion, PLLC (57) ABSTRACT

An electricity storage device includes an electrode assembly, a case, a safety valve, and a cover member. The case accommodates the electrode assembly. The safety valve is arranged in the case and opens to discharge gas out of the case when an inner pressure of the case exceeds a release pressure. The cover member is arranged in the case opposing the safety valve and includes a flow passage for the gas.

10 Claims, 8 Drawing Sheets (51) Int. Cl.
- *H01M 2/26* (2006.01)
- *H01M 2/30* (2006.01)
- *H01G 11/18* (2013.01)
- *H01G 11/78* (2013.01)
- *H01M 2/22* (2006.01)
- *H01M 10/04* (2006.01)
- *H01M 10/0525* (2010.01)
- *H01M 10/0585* (2010.01)

(52) U.S. Cl.
CPC ......... *H01M 2/043* (2013.01); *H01M 2/1223* (2013.01); *H01M 2/22* (2013.01); *H01M 2/266* (2013.01); *H01M 2/305* (2013.01); *H01M 10/0463* (2013.01); *H01M 10/0525* (2013.01); *H01M 10/0585* (2013.01); *H01M 2200/20* (2013.01); *H01M 2220/20* (2013.01); *Y02E 60/122* (2013.01); *Y02E 60/13* (2013.01); *Y02T 10/7022* (2013.01)

(58) Field of Classification Search
CPC ............. H01M 2/305; H01M 10/0463; H01M 10/0525; H01M 10/0585; H01M 2200/20; H01M 2220/20; H01G 11/18; H01G 11/78; Y02E 60/122; Y02E 60/13
See application file for complete search history.

(56) References Cited

U.S. PATENT DOCUMENTS

| | | | |
|---|---|---|---|
| 2009/0122455 A1* | 5/2009 | Jang | H01C 7/02 361/106 |
| 2010/0143789 A1* | 6/2010 | Kim | H01M 2/0404 429/163 |
| 2011/0064979 A1* | 3/2011 | Yokoyama | H01M 2/0413 429/82 |
| 2011/0091752 A1 | 4/2011 | Kim et al. | |
| 2011/0250474 A1* | 10/2011 | Baek | H01M 2/021 429/7 |
| 2013/0130100 A1 | 5/2013 | Kurata et al. | |
| 2014/0127538 A1 | 5/2014 | Uruno et al. | |

FOREIGN PATENT DOCUMENTS

| | | |
|---|---|---|
| JP | 2009-289611 A | 12/2009 |
| JP | 2010-282847 A | 12/2010 |
| JP | 2011-86604 A | 4/2011 |
| JP | 2013-25882 A | 2/2013 |
| WO | 2012/011470 A1 | 1/2012 |

* cited by examiner

2nd End Side ← Stacking Direction → 1st End Side

2nd End Side ⟵ Stacking Direction ⟶ 1st End Side

_US 9,711,768 B2_

ELECTRICITY STORAGE DEVICE

CROSS REFERENCE TO RELATED APPLICATIONS

This application is a National Stage of International Application No. PCT/JP2013/081155 filed Nov. 19, 2013, claiming priority based on Japanese Patent Application Nos. 2012-259679, filed Nov. 28, 2012 and 2013-163354, filed Aug. 6, 2013, the contents of all of which are incorporated herein by reference in their entirety.

TECHNICAL FIELD

The present invention relates to an electricity storage device.

BACKGROUND ART

Rechargeable batteries serving as electricity storage devices that store power supplied to a travel motor are installed in vehicles such as an electric vehicle (EV) and a plug-in hybrid vehicle. A known rechargeable battery includes a case, which accommodates, for example, an electrode assembly, and a safety valve, which is arranged on the case and opens when the inner pressure of the case exceeds a release pressure to discharge the gas generated in the case (refer to, for example, patent document 1).

PRIOR ART DOCUMENT

Patent Document

Patent Document 1: Japanese Laid-Open Patent Publication No. 2006-12831

SUMMARY OF THE INVENTION

When a component accommodated in the case blocks the safety valve from the inner side of the case, gas may not be discharged in a preferred manner.

It is an object of the present invention to provide an electricity storage device that uses a safety valve to discharge gas from a case in a preferred manner.

To achieve the above object, one aspect of the present invention is an electricity storage device including an electrode assembly, a case, a safety valve, and an opposing member. The case accommodates the electrode assembly. The safety valve is arranged in the case. The safety valve opens and discharges gas out of the case when an inner pressure of the case exceeds a release pressure. The opposing member is arranged in the case opposing the safety valve. The opposing member includes a flow passage for the gas.

DETAILED DESCRIPTION OF THE PREFERRED EMBODIMENTS

First Embodiment

A first embodiment of an electricity storage device will now be described.

Figure 1:
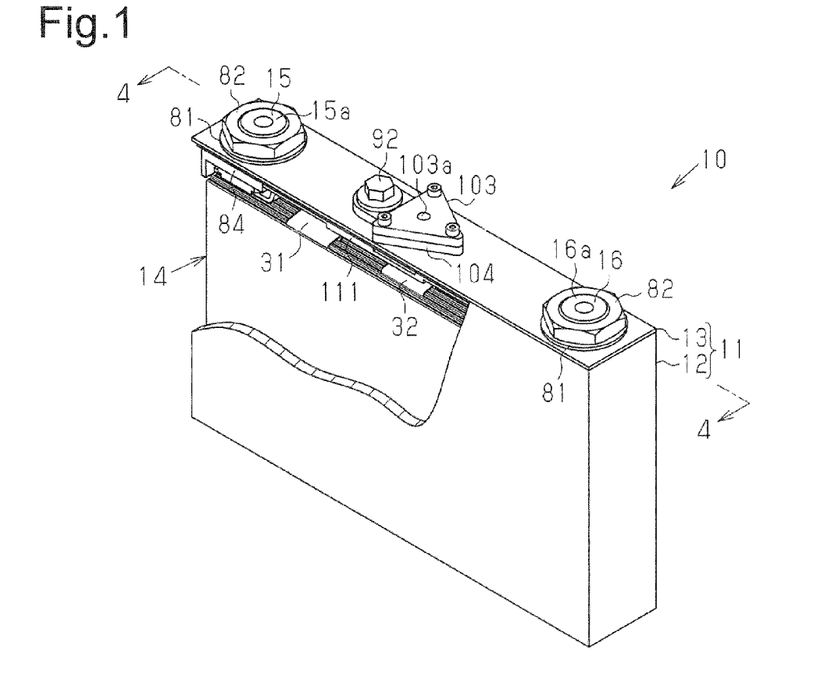
FIG. 1 is a perspective view of a rechargeable battery according to a first embodiment of the present invention.

As shown in FIG. 1, a rechargeable battery 10, which serves as an electricity storage device, includes a case 11, which defines the contour of the rechargeable battery 10. The case 11 includes a square box-shaped container 12 and a rectangular plate-shaped lid 13, which closes the opening of the container 12. Thus, the rechargeable battery 10 is a polygonal battery having a polygonal contour. The container 12 and the lid 13 are formed from a metal. The rechargeable battery 10 of the present embodiment is a lithium-ion battery.

The rechargeable battery 10 includes an electrode assembly 14, which is accommodated in the case 11, and a positive electrode terminal 15 and a negative electrode terminal 16, which are used to transfer power between the electrode assembly 14 and the outside. The terminals 15 and 16 are coupled to the case 11, specifically, to the lid 13. Further, the terminals 15 and 16 are spaced apart and arranged near the two longitudinal ends of the lid 13.

Figure 2:
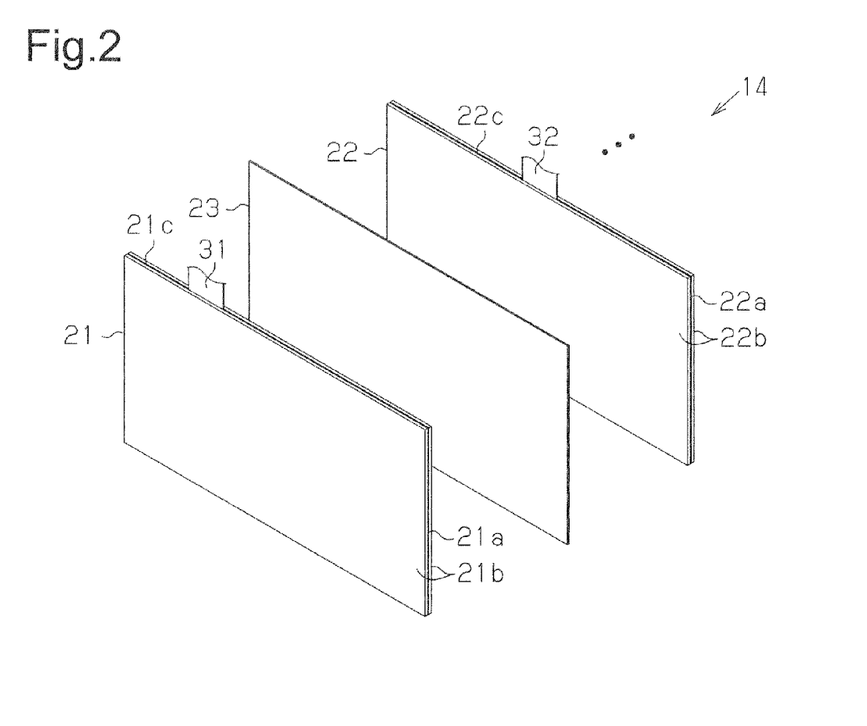
FIG. 2 is an exploded perspective view of an electrode assembly shown in FIG. 1.

As shown in FIG. 2, the electrode assembly 14 is formed by alternately stacking positive electrodes 21 and negative electrodes 22 with separators 23 located between the positive and negative electrodes 21 and 22, which serve as electrodes. The positive electrodes 21 have a polarity that differs from that of the negative electrodes 22. The separators 23 are each formed by a porous film allowing for passage of electrically conductive ions (lithium ions). The electrodes 21 and 22 and the separators 23 are rectangular sheets. In the description hereafter, the stacking direction refers to the stacking direction of the electrode assembly 14 unless otherwise specified.

Each positive electrode 21 includes a rectangular positive electrode metal foil 21a (e.g., aluminum foil) and positive electrode active material layers 21b, which are applied entirely to the two surfaces of the positive electrode metal foil 21a. Each negative electrode 22 includes a rectangular negative electrode metal foil 22a (e.g., copper foil) and negative electrode active material layers 22b, which are applied entirely to the two surfaces of the negative electrode metal foil 22a. When the electrode assembly 14 is formed, the positive electrode active material layers 21b are covered by the negative electrode active material layers 22b, and the electrodes 21 and 22 are covered by the separators 23. The positive electrode 21 corresponds to a first electrode, and the negative electrode 22 corresponds to a second electrode.

A positive electrode tab 31, which serves as a first tab, projects from an end 21c of the positive electrode 21. In the same manner, a negative electrode tab 32, which serves as a second tab, projects from an end 22c of the negative electrode 22. The negative electrode tab 32 is located in the middle of the end 22c of the negative electrode 22, and the positive electrode tab 31 is located at a position deviated from the middle of the end 21c of the positive electrode 21.

Figure 3:
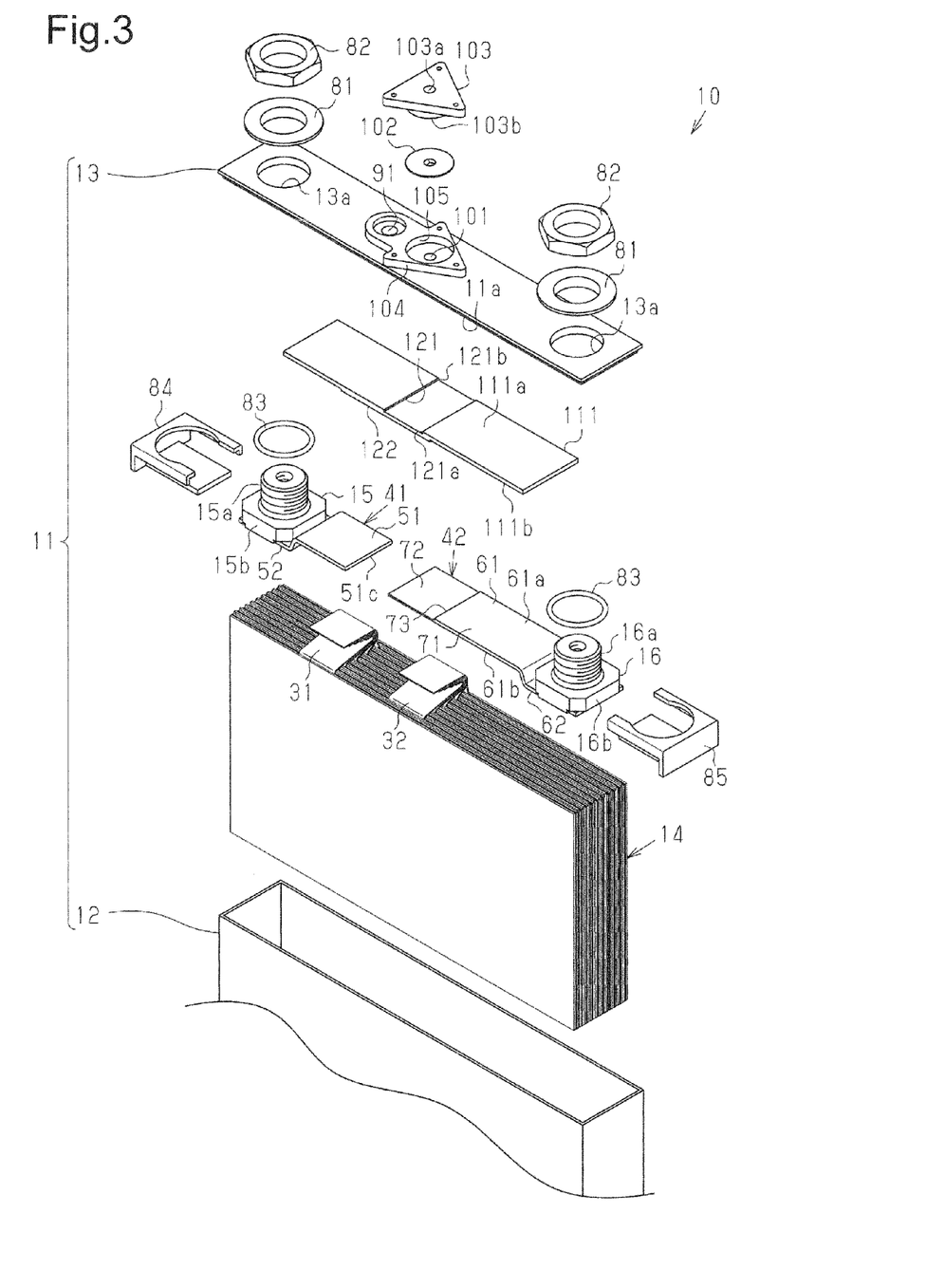
FIG. 3 is an exploded perspective view of the rechargeable battery shown in FIG. 1.

The electrodes 21 and 22 are stacked so that those of the tabs 31 and 32 having the same polarity are arranged in a line. As shown in FIG. 3, the positive electrode tabs 31 are gathered at a first end side in the stacking direction of the electrode assembly 14. The gathered positive electrode tabs 31 are folded to extend toward a second end side, which is opposite to the first end side. In the same manner, the negative electrode tabs 32 are gathered at the first end side in the stacking direction of the electrode assembly 14. The gathered negative electrode tabs 32 are folded to extend toward the second end side, which is opposite to the first end side. The electrode assembly 14 is accommodated in the case 11 so that the tabs 31 and 32 are located at positions opposing the lid 13.

Figure 4:
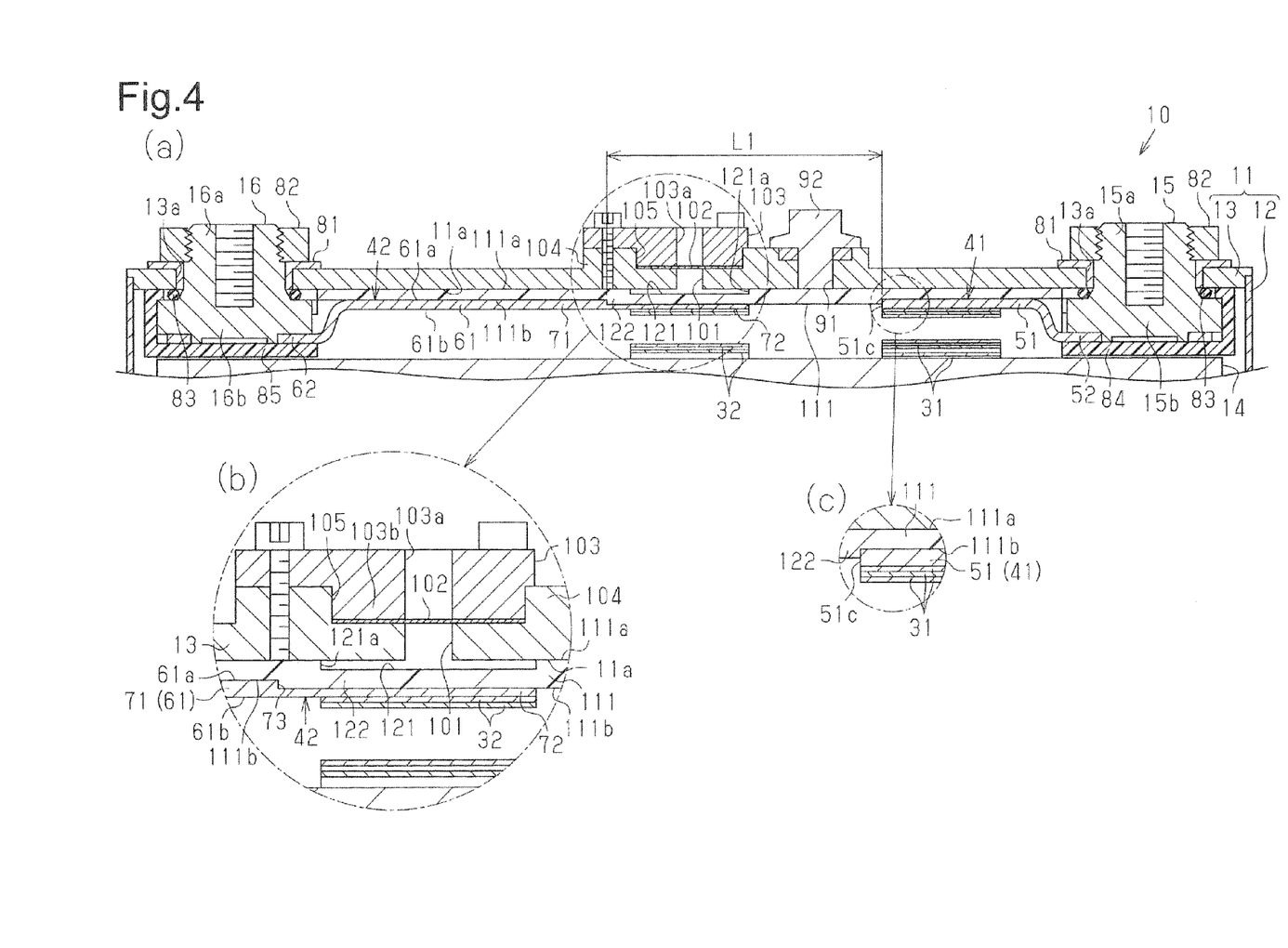
FIG. 4 includes a part (a) showing a cross-sectional view taken along line 4-4 in FIG. 1, and parts (b) and (c) showing partial enlarged views of the part (a).

As shown in FIGS. 3 and 4, the rechargeable battery 10 includes a positive electrode conductor 41, which electrically connects the tabs 31 of the same polarity to the terminal 15, and a negative electrode conductor 42, which electrically connects the tabs 32 of the same polarity to the terminal 16. The conductors 41 and 42 are arranged between the lid 13 and the electrode assembly 14. Further, the conductors 41 and 42 are spaced apart in a direction orthogonal to both of a direction extending from the lid 13 to the positive electrode assembly 14 and the stacking direction of the electrode assembly 14. The positive electrode conductor 41 corresponds to a first conductor, and the negative electrode conductor 42 corresponds to a second conductor.

The positive electrode conductor 41, which is located between the inner surface 11a of the case 11 and the positive electrode tabs 31, is joined with (e.g., welded) both of the positive electrode tabs 31 and the positive electrode terminal 15. As shown in FIG. 3, the positive electrode terminal 15 includes a positive electrode shaft 15a, which has thread grooves in the outer circumferential surface, and a positive electrode head 15b, which is a polygonal post arranged on an axial end of the positive electrode shaft 15a. The positive electrode conductor 41 is formed by bending a single metal plate, for example, an aluminum plate, into a cranked shaped as viewed in the stacking direction. The positive electrode conductor 41 includes a first positive electrode part 51, which is located closer to the case 11, and a second positive electrode part 52, which is located closer to the electrode assembly 14. The positive electrode conductor 41 is coupled to the electrode assembly 14 and the case 11 by joining the first positive electrode part 51 with the positive electrode tabs 31 and joining the second positive electrode part 52 with the positive electrode head 15b.

In the same manner as the positive electrode side, the negative electrode terminal 16 includes a negative electrode shaft 16a and a negative electrode head 16b. The negative electrode conductor 42 is located between the inner surface 11a of the case 11 and the negative electrode tabs 32. The negative electrode conductor 42 is formed by bending a single metal plate, for example, a copper plate, into a cranked shaped as viewed in the stacking direction. The negative electrode conductor 42 includes a first negative electrode part 61, which is located closer to the case 11, and a second negative electrode part 62, which is located closer to the electrode assembly 14 and joined (welded) with the negative electrode head 16b.

As described above, the negative electrode tabs 32 are located in the middle of the ends 22c of the negative electrodes 22, and the positive electrode tabs 31 are located at positions deviated from the middle of the ends 21c of the positive electrodes 21. Thus, as shown in FIG. 3 and a part (a) of FIG. 4, the distance between the negative electrode tabs 32 and the negative electrode terminal 16 is longer than the distance between the positive electrode tabs 31 and the positive electrode terminal 15 in the direction orthogonal to both of the direction extending from the lid 13 to the electrode assembly 14 and the stacking direction. Accordingly, the first negative electrode part 61 is longer than the first positive electrode part 51 in the direction orthogonal to both of the direction extending from the lid 13 to the electrode assembly 14 and the stacking direction. The first negative electrode part 61 overlaps each of the negative electrode tabs 32.

As shown in FIG. 3 and a part (b) of FIG. 4, the first negative electrode part 61 includes a thick portion 71 and a thin portion 72, which have different thicknesses. The first negative electrode part 61 has a surface 61a closer to the lid 13 that includes a step 73, which serves as a border of the thick portion 71 and the thin portion 72. The thin portion 72 is located at a position overlapping the negative electrode tabs 32. The first negative electrode part 61 at the thin portion 72 has a surface 61b closer to the negative electrode tab 32 that is welded to the negative electrode tabs 32.

As shown in FIG. 3 and the part (a) of FIG. 4, the lid 13 includes through holes 13a. The shafts 15a and 16a of the terminals 15 and 16 have ends located at the opposite side of the heads 15b and 16b and projected out of the case 11 through the through holes 13a. When insulation rings 81 are inserted into the through holes 13a, nuts 82 are fastened to the projecting portions of the terminals 15 and 16.

O-rings 83, which serve as seals, are arranged on the shafts 15a and 16a of the terminals 15 and 16. The O-rings 83 are compressed between the lid 13 and the heads 15b and 16b to seal the surroundings of the shafts 15a and 16a.

The rechargeable battery 10 includes a positive electrode insulator 84 that covers the positive electrode head 15b of the positive electrode terminal 15 and the second positive electrode part 52. The positive electrode insulator 84 is fitted to the positive electrode head 15b and the positive electrode shaft 15a, while covering the surface of the second positive electrode part 52 closer to the electrode assembly 14. In the same manner, the rechargeable battery 10 includes a negative electrode insulator 85 fitted to the negative electrode head 16b and the negative electrode shaft 16a, while covering the surface of the second negative electrode part 62 closer to the electrode assembly 14.

As shown in FIG. 3 and a part (a) of FIG. 4, the lid 13 includes a liquid inlet 91 through which an electrolyte is received. As shown in the part (a) of FIG. 4, the liquid inlet 91 is closed by a plug 92 after the electrolyte is received.

The case 11, specifically, the lid 13 includes a gas discharge port 101 that allows gas to be discharged out of the case 11. The gas discharge port 101 extends through the lid 13 in the thicknesswise direction and is circular as viewed in the direction in which the gas discharge port 101 extends. The gas discharge port 101 is arranged next to the liquid inlet 91.

As shown in FIG. 3 and a part (b) of FIG. 4, the gas discharge port 101 is closed by a safety valve 102, which is thinner than the lid 13. The safety valve 102 is arranged between the lid 13 and a coupling plate 103, which is coupled to the lid 13. It is preferred that the safety valve 102 be held between the lid 13 and the coupling plate 103 so as to be sealed by an O-ring. The coupling plate 103 is triangular as viewed from the thicknesswise direction. The middle of the coupling plate 103 includes a through hole 103a having the same diameter as the gas discharge port 101. The coupling plate 103 includes a boss 103b that projects toward the lid 13. The boss 103b is arranged on the surface of the coupling plate 103 closer to the lid 13 around the through hole 103a.

A rib 104 is arranged on the lid 13 around the gas discharge port 101. The rib 104 has an inner diameter that is set to be larger than the diameter of the gas discharge port 101. The rib 104 and the portion around the gas discharge port 101 define a recess 105 capable of receiving the boss 103b. The safety valve 102 is larger than the gas discharge port 101 but may be arranged in the recess 105. The coupling plate 103 is coupled to the rib 104 so that the boss 103b is fitted to the recess 105 with the safety valve 102 arranged in the recess 105. In this case, the safety valve 102 is held and fixed between the boss 103b and the portion around the gas discharge port 101.

The safety valve 102 normally closes the gas discharge port 101. The safety valve 102 opens the gas discharge port 101 when the inner pressure of the case 11 exceeds a release pressure. This discharges gas out of the case 11 through the gas discharge port 101. The thicknesswise direction of the safety valve 102 conforms to the extending direction of the gas discharge port 101. Further, the thicknesswise direction of the safety valve 102 conforms to the direction extending from the lid 13 toward the electrode assembly 14.

As shown in FIGS. 3 and 4, the rechargeable battery 10 includes a cover 111, which serves as an opposing member opposing the safety valve 102 in the case 11. The cover 111 is insulative and rectangular as a whole. The cover 111 is arranged and held between the conductors 41 and 42 and the inner surface 11a of the case 11 on which the safety valve 102 is arranged. The cover 111 includes two surfaces 111a and 111b extending in the direction orthogonal to the thicknesswise direction of the cover 111. The surface 111a, which is closer to the safety valve 102, opposes the safety valve 102. The cover 111 covers the first positive electrode part 51 and the first negative electrode part 61 as viewed in the thicknesswise direction of the safety valve 102. The thicknesswise direction of the cover 111 conforms to the thicknesswise direction of the safety valve 102. The thicknesswise direction of the safety valve 102 conforms to the opposing direction of the safety valve 102 and the cover 111.

As shown in the parts (a) and (b) of FIG. 4, the surface 111a of the cover 111 closer to the safety valve 102 and overlapping the safety valve 102 as viewed in the opposing direction of the safety valve 102 and the cover 111 includes a groove 121 recessed in the thicknesswise direction of the cover 111. As shown in FIG. 3, the longitudinal direction of the groove 121 extends in a direction orthogonal to the opposing direction, namely, the short side direction of the cover 111 in the present embodiment. The longitudinal ends of the groove 121 include openings 121a and 121b. The groove 121 forms a flow passage for gas. The groove 121 has a flat bottom surface.

As shown in a part (b) of FIG. 4, the width of the groove 121 in the longitudinal direction and the short side direction is greater than diameter of the gas discharge port 101. The width and the depth of the groove 121 are set so that the area of a gas flow passage is greater than the open area of the safety valve 102 when the safety valve 102 is open.

The area of the gas flow passage is in accordance with the total area of the openings 121a and 121b. More specifically, in the structure in which the two ends of the groove 121 are the openings 121a and 121b, gas flows into the groove 121 from the two openings 121a and 121b. Thus, in comparison to a structure in which one of the two ends is closed, the gas flow passage has a larger area.

The open area of the safety valve 102 may be controlled by punching the safety valve 102. The open area of the safety valve 102 is set to have, for example, the same area as the gas discharge port 101.

As shown in FIG. 4, among the two surfaces 111a and 111b of the cover 111, the surface 111b located at the side of the conductors 41 and 42 opposite to the surface 111a, which is located at the side of the safety valve 102, is in contact with the conductors 41 and 42.

The cover 111 includes a projection 122 on the surface 111b closer to the conductors 41 and 42. The projection 122 projects toward the electrode assembly 14. A portion of the projection 122 is arranged between the conductors 41 and 42, which are spaced apart in a direction orthogonal to both of the opposing direction of the safety valve 102 and the cover 111 and the stacking direction. A different portion of the projection 122 overlaps the thin portion 72 as viewed from the opposing direction.

The projection 122 is fitted between the positive electrode conductor 41 and the negative electrode conductor 42. In detail, as shown in the part (a) of FIG. 4, the projection 122 has a length L1 in the direction orthogonal to both of the opposing direction and the stacking direction that is set to be the same as the distance between the step 73 and the end 51c of the first positive electrode part 51 closer to the first negative electrode part 61. The dimension of the projection 122 is set to be the same as the dimension of the step 73. As shown in the parts of (b) and (c) of FIG. 4, the projection 122 is in contact with the end 51c of the first positive electrode part 51 closer to the first negative electrode part 61. Further, the projection 122 is in contact with the step 73 of the first negative electrode part 61.

The gas discharge port 101 is arranged at the middle of the lid 13 in the longitudinal direction. The safety valve 102, the gas discharge port 101, the groove 121, the projection 122, the thin portion 72, and each negative electrode tab 32 are aligned in the opposing direction of the safety valve 102 and the cover 111. That is, a portion of the projection 122 overlaps the groove 121 as viewed in the opposing direction.

Figure 5:
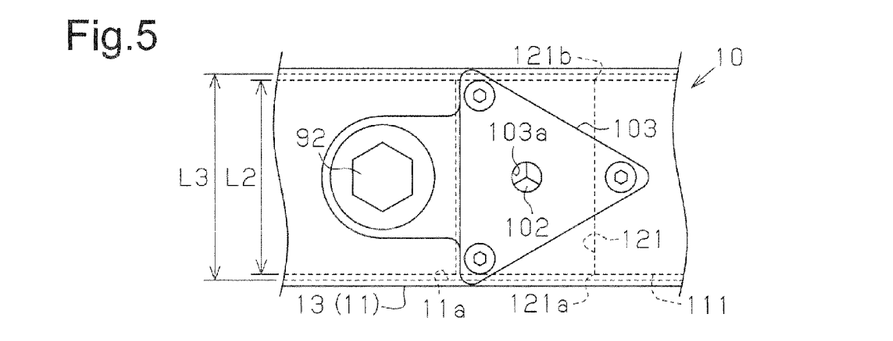
FIG. 5 is a plan view showing the structure around the safety valve of FIG. 3.

As shown in FIG. 5, the length L2 of the cover 111 in the stacking direction is set to be shorter than the distance L3 between the inner surfaces 11a of the case 11 in the stacking direction. This forms a gas flow passage between the cover 111 and inner surface 11a of the case 11. The gas flow passage is the gap between the openings 121a and 121b of the groove 121, which are spaced apart in the stacking direction, and the inner surfaces 11a of the case 11. The gap between each of the openings 121a and 121b and the inner surfaces 11a of the case 11 is set so that that the area of the gas flow passage is sufficient.

The present embodiment operates in the following manner.

The cover 111 is arranged between the conductors 41 and 42 and the inner surface 11a of the case 11. The cover 111 is opposed to the safety valve 102. Further, the groove 121 is located in the surface 111a of the cover 111 that is closer to the safety valve 102 and overlaps the safety valve 102 in the opposing direction of the safety valve 102 and the cover 111. When the safety valve 102 opens, gas flows from the case 11 through the groove 121 to the gas discharge port 101. Then, the gas is discharged out of the case 11.

The present embodiment described above in detail has the following advantages.

(1) The rechargeable battery 10 includes the cover 111, which includes a gas flow passage and which is arranged in the case 11 opposed to the safety valve 102. This avoids a situation in which the gas flow passage is closed. Thus, gas may be discharged through the flow passage in a preferred manner. Further, the cover 111 restricts the striking of foreign objects against the safety valve 102 and avoids damage of the safety valve 102 that would be caused by foreign objects.

(2) The cover 111 is located between the conductors 41 and 42 and the inner surface 11a of the case 11 on which the safety valve 102 is arranged. This avoids an undesirable situation in which the conductors 41 and 42 move toward the inner surface 11a of the case 11 and block the gas flow passage.

(3) In particular, the cover 111 is held between the inner surface 11a of the case 11 and the conductors 41 and 42. In detail, the cover 111 is held between the inner surface 11a of the case 11 and the first positive electrode part 51 and the first negative electrode part 61 of the conductors 41 and 42 located closer to the inner surface 11a of the case 11. This limits movement of the conductors 41 and 42 toward the inner surface 11a of the case 11 and limits displacement of the cover 111. Since there are no gaps between the cover 111, the inner surface 11a of the case 11 and conductors 41 and 42, the used space may be reduced accordingly.

The first positive electrode part 51 and the first negative electrode part 61 are crank-shaped as viewed from the stacking direction to approach the inner surface of the case 11. This reduces dead space by arranging the tabs 31 and 32 close to the inner surface 11a of the case 11, while joining the conductor 41 and the tabs 31, which have the same polarity, and joining the conductor 42 and the tabs 32, which have the same polarity. The first negative electrode part 61, which overlaps the safety valve 102 as viewed from the opposing direction of the safety valve 102 and the cover 111, may easily block the gas flow passage. However, in the present embodiment, the cover 111 avoids such an undesirable situation that would occur when reducing dead space.

(4) The cover 111 is insulative. Thus, when a component is arranged at the side of the inner surface 11a of the case 11 opposite to the cover 111, short-circuiting may be restricted between the component and the case 11. That is, short-circuiting may be restricted between the conductors 41 and 42 and the case 11 by the cover 111. This eliminates the need for a separate insulator and allows for simplification of the structure.

(5) The groove 121 is arranged in the surface 111a of the cover 111 that is closer to the safety valve 102 at a location overlapping the safety valve 102 as viewed from the opposing direction of the safety valve 102 and the cover 111. The groove 121 extends in a direction orthogonal to the opposing direction, and the two ends in the orthogonal direction include the openings 121a and 121b. Thus, gas from the case 11 flows through the groove 121 to the gas discharge port 101. In this case, the groove 121 is further recessed from the surface 111a of the cover 111 that is closer to the safety valve 102. This ensures that a flow passage is obtained for the gas even though the inner surface 11a of the case 11 contacts the surface 111a of the cover 111 that is closer to the safety valve 102. Further, in a structure in which a portion of the cover 111 contacts the inner surface 11a of the case 11, gaps may be eliminated between the cover 111 and the case 11, while ensuring that the gas flow passage is obtained. This reduces the used space. Further, in a structure in which the cover 111 is spaced apart from the inner surface 11a of the case 11, a flow passage for gas may be obtained even when the cover 111 moves toward the inner surface 11a of the case 11 due to gas or the like.

(6) The groove 121 extends in the short side direction of the cover 111, which is a rectangular plate. This shortens the distance in which gas flows through the groove 121. Thus, gas may be discharged in a preferred manner.

(7) The surface 111b of the cover 111 closer to the conductors 41 and 42 include the projection 122 fitted between the positive electrode conductor 41 and the negative electrode conductor 42. The projection 122 restricts movement of the conductors 41 and 42 toward each other. This limits short-circuiting that would occur when the conductors 41 and 42 contact each other.

(8) The first negative electrode part 61 of the negative electrode conductor 42 includes the thick portion 71 and the thin portion 72, which have different thicknesses. This thin portion 72 is welded to the negative electrode tabs 32. This reduces heat dispersion compared to a structure in which the thick portion 71 is welded to the negative electrode tab 32. Thus, the negative electrode tabs 32 may be welded to the negative electrode conductor 42 in a preferred manner. In this case, the thin portion 72 may form dead space corresponding to the step 73 between the first negative electrode part 61 and the cover 111.

To cope with this matter, the cover 111 is formed so that a portion of the projection 122 overlaps the thin portion 72 as viewed from the opposing direction of the safety valve 102 and the cover 111. This arranges a portion of the projection 122 in the dead space. Thus, the dead space may be used to increase the strength of the cover 111.

The copper plate forming the negative electrode conductor 42 has a lower resistance than the aluminum plate forming the positive electrode conductor 41. Thus, when power for resistance welding is applied to the negative electrode conductor 42, the power is not easily transformed to heat, and welding failures tend to occur. To cope with this matter, the negative electrode conductor 42, which serves as a conductor, includes the thin portion 72. Thus, welding may be performed in a preferred manner at the negative electrode, which is particularly where welding failures have a tendency to occur due to differences in the resistance.

(9) The safety valve 102, the groove 121, and the projection 122 are aligned in the opposing direction of the safety valve 102 and the cover 111. This allows the projection 122 to compensate for the decrease in strength that may be caused by the arrangement of the groove 121.

(10) The gas discharge port 101 and the safety valve 102 are located at the middle of the lid 13 in the longitudinal direction. This stabilizes the discharge of gas. Further, the negative electrode tabs 32 are located at the middle of the lid 13 closer to the positive electrode tabs 31 than the negative electrode terminal 16. This obtains space between the negative electrode tabs 32 and the negative electrode terminal 16 where components such as a CID.

When the layout of the gas discharge port 101 and the negative electrode tabs 32 is as described above, the gas discharge port 101 and the negative electrode tabs 32 are aligned in the opposing direction of the safety valve 102 and the cover 111. Thus, to obtain the advantages described above, in the opposing direction, the groove 121 is arranged at a position overlapping the safety valve 102, the thin portion 72 is arranged at a position overlapping the negative electrode tabs 32, and the projection 122 is arranged overlapping the thin portion 72. This aligns the groove 121, the projection 122, and the thin portion 72 in the opposing direction. As a result, the advantages described above may all be obtained.

(11) The area of the gas flow passage formed by the cover 111 is set to be greater than the open area of the safety valve 102 when the safety valve 102 opens. Thus, the gas flow passage does not restrict the discharge of gas. This discharges gas out of the case 11 in a preferred manner.

Second Embodiment

A second embodiment of an electricity storage device applied to a rechargeable battery will now be described with reference to FIGS. 6 and 7. In the embodiment described hereafter, same reference numerals are given to those components that are the same as the corresponding components of the first embodiment. Such components will not be described in detail.

Figure 6:
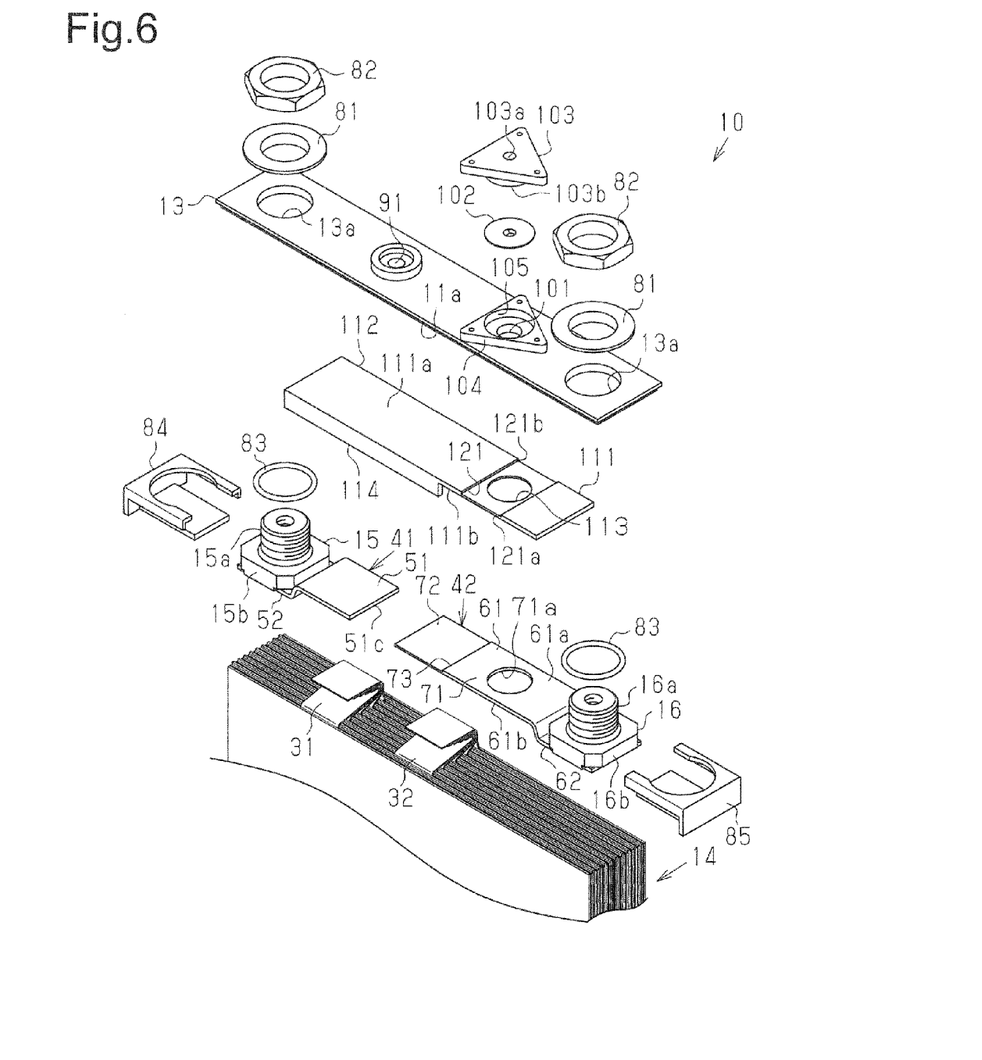
FIG. 6 is an exploded perspective view showing a rechargeable battery according to a second embodiment of the present invention.
Figure 7:
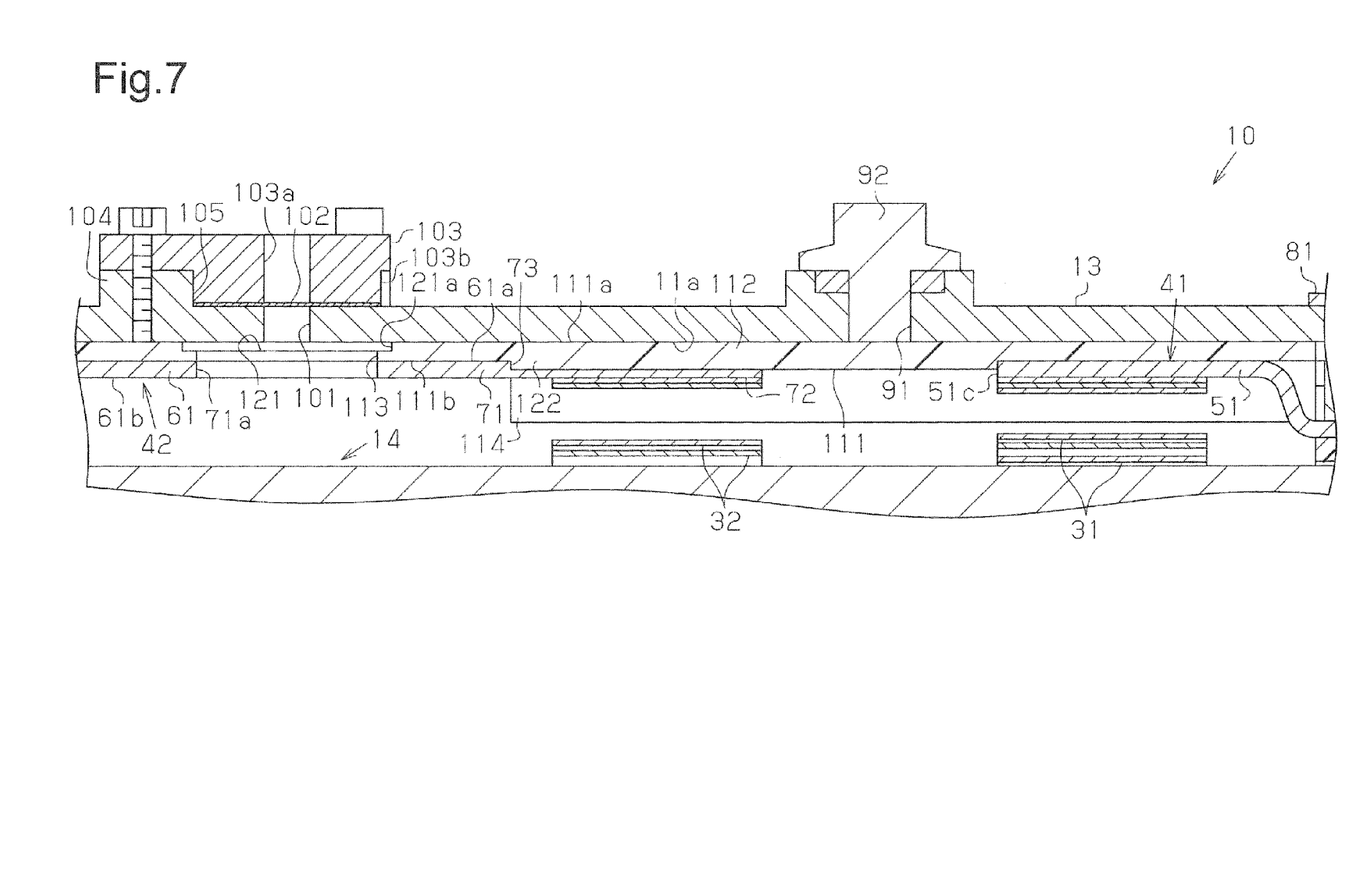
FIG. 7 is a cross-sectional view showing the structure around a safety valve of the rechargeable battery shown in FIG. 6.

As shown in FIGS. 6 and 7, the cover 111 includes a rectangular main body 112 and a groove 121, which is located in the proximity of a first longitudinal end of the main body 112 (near negative electrode terminal 16). Further, the cover 111 includes a circular exhaust port 113, which extends through the main body 112 in the opposing direction of the safety valve 102 and the cover 111, near the first longitudinal end of the main body 112. The exhaust port 113 is located at a position overlapping the safety valve 102 as viewed in the opposing direction of the safety valve 102 and the cover 111. The safety valve 102 is located closer to the negative electrode terminal 16 than the first embodiment.

The cover 111 includes extension pieces 114, each arranged on one of the two side edges extending in the longitudinal direction of the main body 112. Each extension piece 114 projects from the surface 111b of the main body 112 that is closer to the conductors 41 and 42. Further, each extension piece 114 covers the first positive electrode part 51 of the positive electrode conductor 41, the positive electrode tabs 31, and the thin portion 72 of the first negative electrode part 61 from beside in the stacking direction. The two extension pieces 114 are located at the two sides of the positive electrode tabs 31 and the negative electrode tabs 32 in the stacking direction.

The thick portion 71 of the negative electrode conductor 42 includes a circular communication aperture 71a, which extends through the thick portion 71 in the opposing direction. The communication aperture 71a and the exhaust port 113 of the main body 112 have the same diameter and the same open area. The communication aperture 71a and the exhaust port 113 are aligned and are in communication with each other. Thus, the gas discharge port 101 and the region in the case 11 where the electrode assembly 14 is located are in communication through the exhaust port 113 and the communication aperture 71a in addition to the openings 121a and 121b of the grooves 121.

Accordingly, in addition to claims (1) to (7) and (11) of the first embodiment, the second embodiment has the following advantage.

(12) The thick portion 71 of the negative electrode conductor 42 includes the communication aperture 71a, and the main body 112 of the cover 111 includes the exhaust port 113. The communication aperture 71a and the exhaust port 113 are overlapped and are in communication with each other. Thus, even when hot gas generated in the case 11 melts and deforms the cover 111 thereby closing the openings 121a and 121b of the groove 121, the exhaust port 113 and the communication aperture 71a allow for communication of the gas discharge port 101 and the inside of the case 11. Thus, the gas in the case 11 flows from the communication aperture 71a and through the exhaust port 113 so that the gas may be discharged out of the case 11 from the open safety valve 102.

Third Embodiment

A third embodiment of an electricity storage device applied to a rechargeable battery will now be described with reference to FIGS. 8 and 9. In the embodiment described hereafter, same reference numerals are given to those components that are the same as the corresponding components of the first embodiment. Such components will not be described in detail.

Figure 8:
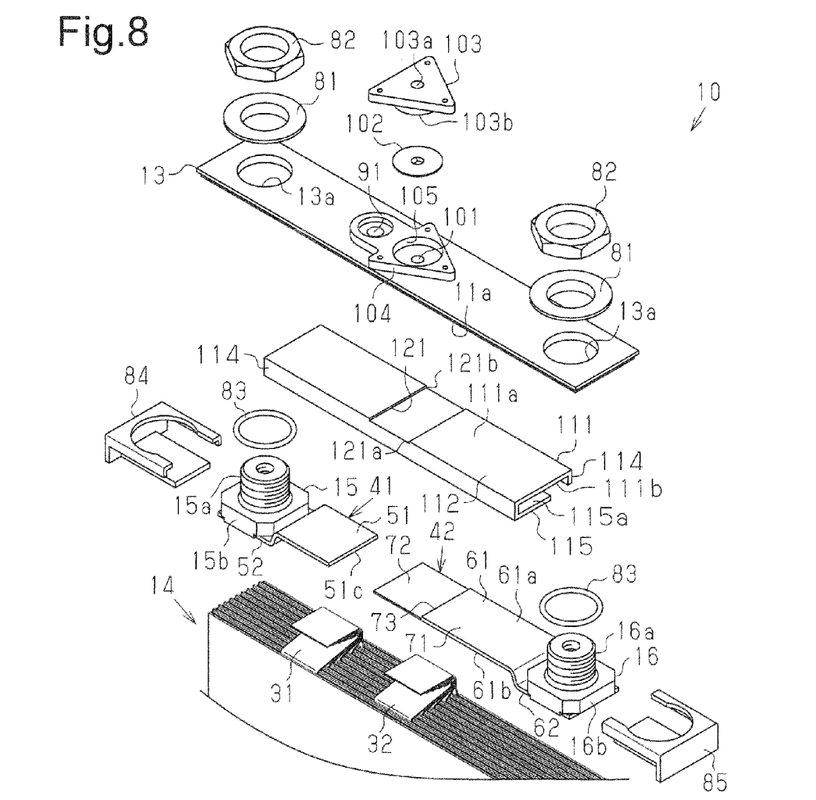
FIG. 8 is an exploded perspective view showing a rechargeable battery according to a third embodiment of the present invention.

As shown in FIG. 8, the cover 111 differs from the second embodiment in that each extension piece 114 extends throughout the main body 112 in the longitudinal direction. Further, among the two extension pieces 114, the first extension piece 114 located at a second end side in the stacking direction includes a holding piece 115, which is arranged at a distal portion of the first extension piece 114. The holding piece 115 is separated from and extends parallel to the surface 111b of the main body 112 that is closer to the conductors 41 and 42. The two extension pieces 114 and the holding piece 115 are flexible and may be elastically deformed.

Figure 9:
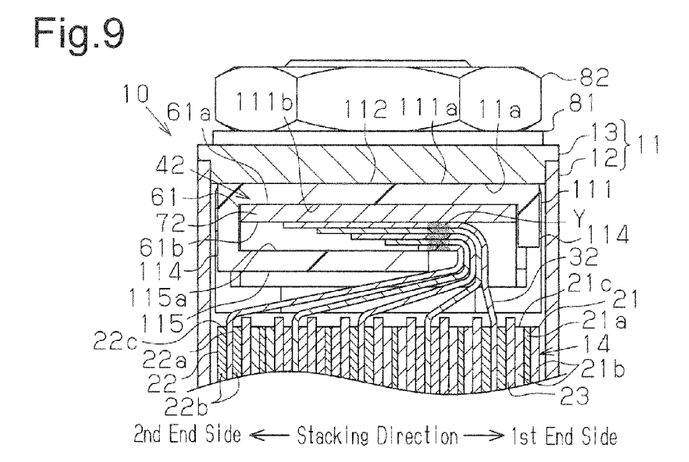
FIG. 9 is a partial cross-sectional view of the rechargeable battery of FIG. 8 with a cover coupled to the rechargeable battery.

As shown in FIG. 9, the second end side in the stacking direction is the side where the distal ends of the folded portions of the gathered positive electrode tabs 31 and the negative electrode tabs 32 are located. The positive electrode tabs 31 and the negative electrode tabs 32 that are stacked are all welded at welded portion Y.

The surface 111b of the main body 112 of the cover 111 closer to the conductors 41 and 42 is in contact with the first positive electrode part 51 of the positive electrode conductor 41 and the negative electrode part 61 of the negative electrode conductor 42. The holding piece 115 includes an inner surface 115a that is in contact with the one of the positive electrode tabs 31 and the one of the negative electrode tabs 32 closest to the electrode assembly 14. The inner surface 115a is the surface of the holding piece 115 opposing the surface 111b of the main body 112 that is closer to the conductors 41 and 42. The holding piece 115 contacts the portions of the positive electrode tabs 31 and the negative electrode tabs 32 at the distal side (second end side) of the welded portion Y to hold the stacked positive electrode tabs 31, the stacked negative electrode tabs 32, and the conductors 41 and 42 with the main body 112.

In the manufacturing process of the rechargeable battery 10, the positive electrode conductor 41 is joined with the positive electrode tabs 31 of the electrode assembly 14, and the negative electrode conductor 42 is joined with the negative electrode tabs 32. Then, the cover 111 is coupled. To couple the cover 111, the main body 112 is first elastically deformed from the intersection of the first extension piece 114 to increase the distance between the holding piece 115 and the main body 112. In this situation, the inner surfaces of the folded positive electrode tabs 31 and negative electrode tabs 32 are arranged in contact with the inner surface 115a of the holding piece 115. Then, the elastically deformed main body 112 is returned to its original form. The main body 112 is arranged in contact with the conductors 41 and 42, and the second extension piece 114 is engaged with the edges of the conductors 41 and 42. This couples the cover 111 to the conductors 41 and 42. As a result, the conductors 41 and 42 and the tabs 31 and 32 are held and integrally constrained by the cover 111.

After mounting the cover 111, the positive electrode conductor 41 and the negative electrode conductor 42 are fastened to the lid 13. Then, the electrode assembly 14 is accommodated in the container 12, and the lid 13 is joined with the container 12. This manufactures the rechargeable battery 10.

Accordingly, in addition to advantages (1) to (7) and (11) of the first embodiment, the third embodiment has the advantages described below.

(13) When the positive electrode tabs 31 are joined with the positive electrode conductor 41, the portion of the positive electrode tabs 31 that is not joined with the positive electrode conductor 41 is unstable. In the present embodiment, the main body 112 of the cover 111 and the holding piece 115 hold the positive electrode tabs 31 and the positive electrode conductor 41. The main body 112 and the cover 111 also hold the negative electrode tabs 32 and the negative conductor 42. The cover 111 constrains the distal side of the welded portion Y in the positive electrode tabs 31 and the negative electrode tabs 32. As a result, in the positive electrode tabs 31 and the negative electrode tabs 32, the portion at the distal side of the welded portion Y is stabilized and not moved by vibration or the like.

(14) The positive electrode tab 31 and the negative electrode tab 32 are held between the two extension pieces 114 of the cover 111 from two sides in the stacking direction of the electrode assembly 14. Thus, the extension pieces 114 protect the vicinity of the welded portion Y of the positive electrode tabs 31 and the positive electrode conductor 41 and the vicinity of the welded portion Y of the negative electrode tabs 32 and the negative electrode conductor 42. The extension pieces 114 limit the entrapment of a foreign material in the safety valve 102.

The above embodiments may be modified as described below.

Figure 10:
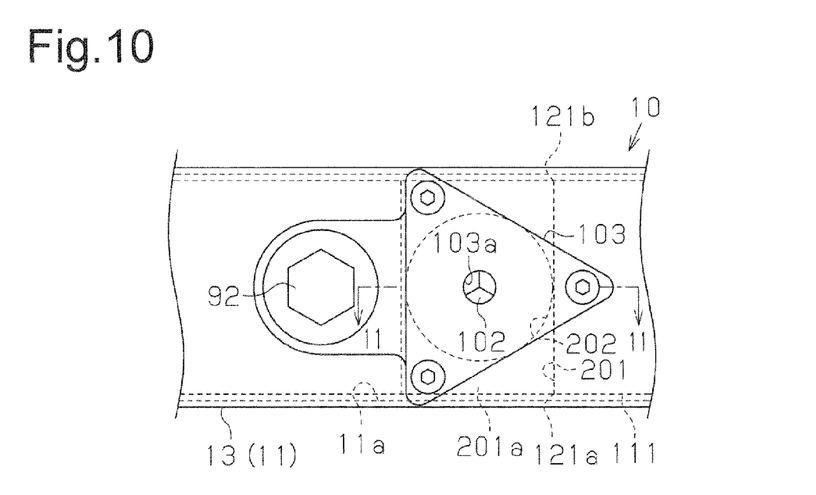
FIG. 10 is a plan view showing another example of a groove.
Figure 11:
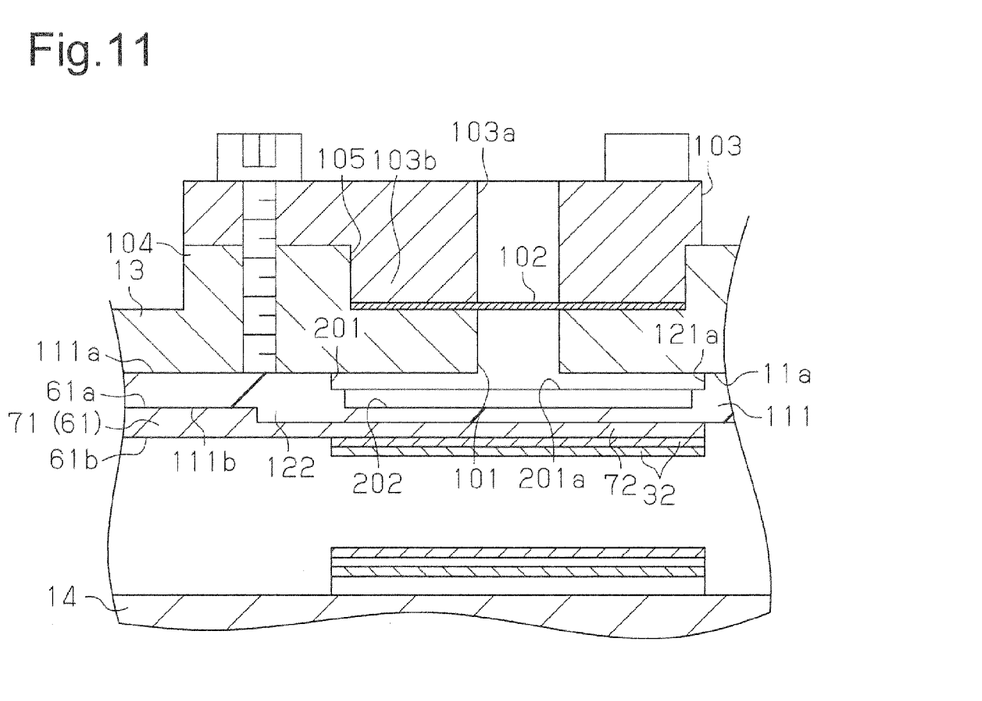
FIG. 11 is a cross-sectional view taken along line 11-11 in FIG. 10.

In each of the above embodiments, the bottom surface of the groove 121 is flat. Instead, as shown in FIGS. 10 and 11, a groove 201 at a location overlapping the safety valve 102, as viewed from the opposing direction of the safety valve 102 and the cover 111, may include a bottom surface 201a that is recessed. For example, the bottom surface 201a of the groove 201 at the above location may include a cylindrical hole 202, which serves as the recess, so that the groove 201 is stepped. In this case, as shown in FIG. 10, it is preferred that the diameter of the hole 202 be set to be larger than the diameter of the safety valve 102. This ensures that a flow passage area for gas is obtained immediately below the safety valve 102 and allows gas to be discharged in a further preferable manner.

Figure 12:
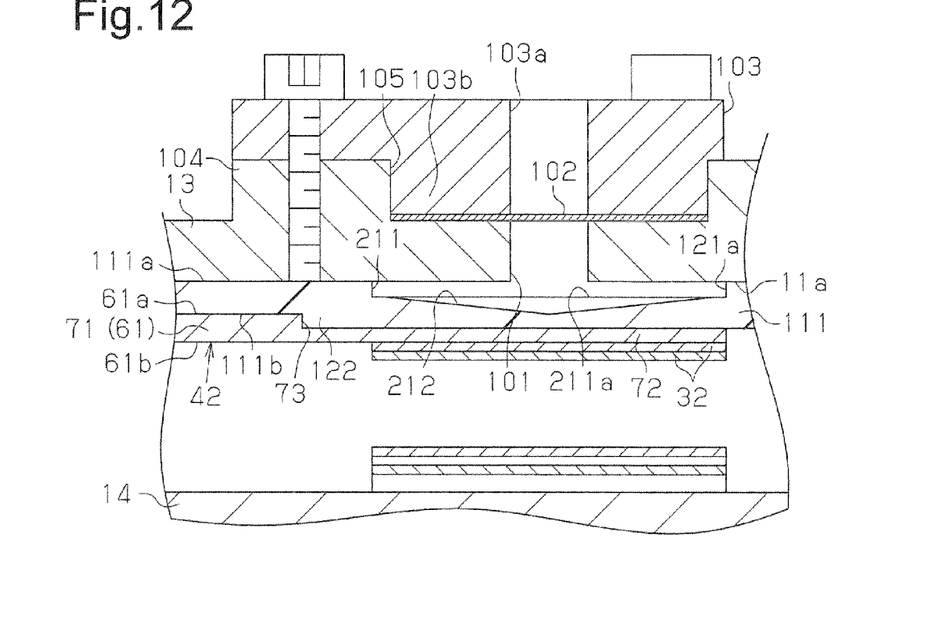
FIG. 12 is a cross-sectional view showing another example of a groove.

The recess in the bottom surface of the groove may have any shape. For example, the bottom surface 211a of the groove 211 may include a tapered hole 212 that serves as a recess. This also obtains the advantages described above.

Figure 13:
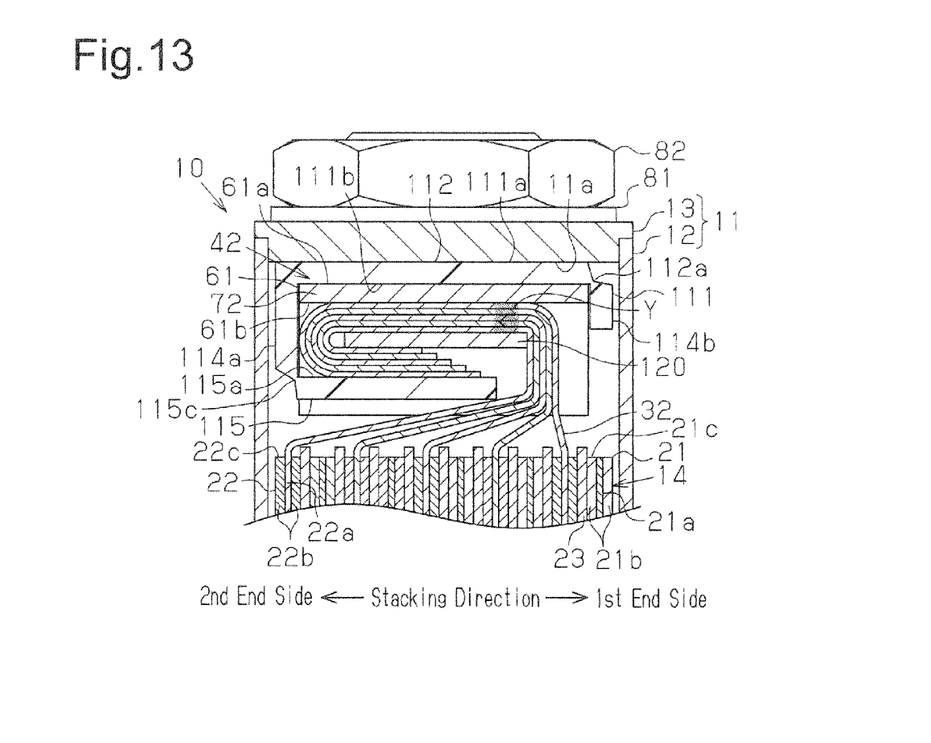
FIG. 13 is a partial cross-sectional view showing another example of the third embodiment.

As shown in FIG. 13, in the third embodiment, the cover 111 may be formed by bending a plate into a U-shape. The cover 111 includes a main body 112 and a first extension piece 114a, which are formed integrally in advance to be L-shaped. The cover 111 includes a first bent portion 115c, which is located at the border of the extension piece 114a and the holding piece 115, and a second bent portion 112a, which is located at the border of the main body 112 and the second extension piece 114b.

In the thin portion 72 of the negative electrode conductor 42, the surface 61b of the first negative electrode part 61 closer to the negative electrode tabs 32 is welded with the negative electrode tabs 32 through resistance welding. During the resistance welding, a welding plate 120 is arranged at a position closer to the electrode assembly 14 than all of the electrode tabs 32. The negative electrode tabs 32 are all held from the two end sides in the direction orthogonal to the stacking direction by the thin portion 72 of the negative electrode conductor 42 located at a position close to the lid 13 and the welding plate 120 located at position close to the electrode assembly 14. Then, the thin portion 72 of the negative electrode conductor 42 and the welding plate 120 are held by a resistance welder (not shown). The thin portion 72 of the negative electrode conductor 42, every one of the negative electrode tabs 32, and the welding plate 120 are welded so that the negative electrode tabs 32 are all connected to the negative electrode conductor 42.

The portion of every one of the negative electrode tabs 32 at the distal side of the welding portion Y is not joined with the thin portion 72 of the negative conductor 42 and serves as a free end that is movable in the stacking direction of the negative electrode tabs 32. In every one of the negative electrode tabs 32, the portion located at the distal side of the welded portion Y and beyond the welding plate 120 is folded from the edge of the welding plate 120. Accordingly, the free end of every one of the negative electrode tabs 32 is folded into two with the welding plate 120 located in between.

The procedures for coupling the cover 111 when the thin portion 72 of the negative electrode conductor 42 and the welding plate 120 have been welded to every one of the negative electrode tabs 32 will now be described. First, the holding piece 115 is bent from the first bent portion 115c with the main body 112 covering the negative electrode tab 32. As a result, the inner surface 115a of the holding piece 115 bends the free end of every one of the negative electrode tabs 32 from the edge of the welding plate 120. Thus, the bending of the holding piece 115 enables the main body 112 and the holding piece 115 to hold, in between, the negative electrode tabs 32, the thin portion 72 of the negative conductor 42, and the welding plate 120 while folding the free ends. This facilitates the coupling of the cover 111.

Then, the second extension piece 114b is bent from the second bent portion 112a. As a result, the second extension piece 114b insulates the negative electrode tabs 32 from the container 12.

The positive electrode tabs 31 may be held by the cover 111 in the same manner as the negative electrode tabs 32.

In each embodiment, the cover 111 is located between the conductors 41 and 42 and the inner surface 11a of the case 11. Instead, for example, the conductors 41 and 42 may be omitted or arranged at different locations, and the cover 111 may be arranged between the electrode assembly 14 and the inner surface 11a of the case 11.

The cover 111 is insulative but may be conductive instead. In this case, the arrangement of a separate insulator is preferred.

The groove 121 includes the openings 121a and 121b at the two longitudinal ends but may include an opening at only one longitudinal end. In this case, compared to the structure that includes the openings 121a and 121b in the two longitudinal ends, the gas flow passage area is one half. Thus, to ensure that the gas flow passage area is obtained, the groove 121 may be deepened.

The cover 111 is held between the conductors 41 and 42 and the inner surface 11a of the case 11 but instead may be spaced apart from the conductors 41 and 42 and the inner surface 11a of the case 11. The cover 111 need only be arranged between the conductors 41 and 42 and the inner surface 11a of the case 11.

Further, the cover 111 may be arranged only between the negative electrode conductor 42 and the inner surface 11a of the case 11. When the safety valve 102 is located at a position close to the positive electrode tab 31, the cover 111 may be arranged only between the positive electrode conductor 41 and the inner surface 11a of the case 11. Moreover, a cover between the positive electrode conductor 41 and the inner surface 11a of the case 11 and a cover between the negative electrode conductor 42 and the inner surface 11a of the case 11 may be separate bodies.

The conductors 41 and 42 are crank-shaped as viewed from the stacking direction but instead may have any shape. It is only necessary that in the conductors 41 and 42, the terminal 15 and the tabs 31 having the same polarity are joined, and the terminal 16 and the tabs 31 having the same polarity are joined.

In each embodiment, the projection 122 does not have to be fitted between the positive electrode conductor 41 and the negative electrode conductor 42. It is only necessary that at least a portion of the projection 122 is located between the conductors 41 and 42 to limit short-circuiting between the conductors 41 and 42. For example, the projection may contact the end 51c of the first positive electrode part 51 and an end of the first negative electrode part 61 opposing the end 51c. Further, the projection 122 may be omitted.

In each embodiment, the first negative electrode part 61 includes the thin portion 72. Instead, the first positive electrode part 51 may include the thin portion 72. Further, the first negative electrode part 61 and the first positive electrode part 51 may both include the thin portion 72. Alternatively, the first negative electrode part 61 and the first positive electrode part 51 may both be less the thin portion 72.

The longitudinal width of the groove 121 may be smaller than the diameter of the safety valve 102. In this case, the groove 121 may be deepened so that the flow passage area of gas is greater than the open area of the safety valve 102.

The flow passage area of gas may be smaller than the open area of the safety valve 102.

In lieu of or in addition to the groove 121 that extends in the short side direction of the cover 111, a groove that extends in the longitudinal direction may be arranged in the cover 111.

The safety valve is not limited to the shape of the embodiments and may have any shape. For example, the lid 13 is partially pressed to include a locally thin portion. The thin portion undergoes processing such as punching so use the thin portion as a safety valve.

In the first and third embodiments, the lid 13 includes the gas discharge port 101 and the like. Instead, the gas discharge port 101 may be arranged in, for example, any one of the surfaces of the container 12. In this case, the cover 111 may be arranged between the inner surface of the portion of the container 12, at which the gas discharge port 101 is arranged, and the electrode assembly 14 or the conductors 41 and 42.

In the above embodiments, the safety valve 102 is arranged at the middle of the lid 13. Instead, for example, the safety valve 102 may be arranged at a location separated from the middle of the lid 13. Likewise, the negative electrode tabs 32 may be arranged at a location separated from the middle of the ends 22c of the negative electrodes 22.

The safety valve 102 may be separated from the negative electrode tabs 32 as viewed from the opposing direction of the safety valve 102 and the cover 111.

The cover 111 does not have to be plate-shaped. For example, the cover 111 may have any shape as long as the groove 121 is included.

In the second embodiment, the shape, number, and location of the exhaust port 113 and the communication aperture 71a may be changed.

In the third embodiment, the thick portion 71 of the negative electrode conductor 42 may include the communication aperture 71a, and the main body 112 of the cover 111 may include the exhaust port 113.

In the third embodiment, in addition to the first extension piece 114, the holding piece 115 may be arranged on the second extension piece 114.

In the second embodiment, the length of the first positive electrode part 51 in the positive electrode conductor 41 and the length of the first negative electrode part 61 in the negative electrode conductor 42 may be reversed, and a communication aperture may be included in the first positive electrode part 51 of the positive electrode conductor 41.

The rechargeable battery 10 of each embodiment may be installed in any subject. For example, the rechargeable battery 10 may be installed in a vehicle, such as an automobile or an industrial vehicle, or in a stationary electricity storage unit.

The present invention may be applied to another electricity storage device such as an electrical double layer capacitor.

In each embodiment, the rechargeable battery 10 is a lithium-ion battery but instead may be another type of a rechargeable battery such as a nickel-metal hydride battery. The present invention may be applied to any rechargeable battery that moves ions between a positive electrode active material layer and a negative electrode active material layer.

The invention claimed is:

1. An electricity storage device comprising:
   an electrode assembly;
   a case that accommodates the electrode assembly;
   a safety valve arranged in the case, wherein the safety valve opens and discharges gas out of the case when an inner pressure of the case exceeds a release pressure; and
   an opposing member arranged in the case opposing the safety valve, wherein the opposing member includes a flow passage for the gas, and wherein
   the electrode assembly is formed by stacking electrodes and a separator,
   ends of the electrodes respectively include tabs,
   a conductor joined with the tabs is arranged between the tabs and an inner surface of the case,
   the opposing member is plate-shaped and located between the conductor and the inner surface of the case on which the safety valve is arranged,
   the electrodes include a first electrode and a second electrode having different polarities,
   the tabs include a first tab arranged on the end of the first electrode and a second tab arranged on the end of the second electrode,
   the conductor is one of a first conductor joined with the first tab and a second conductor joined with the second tab,
   the first conductor and the second conductor are spaced apart in a direction orthogonal to both of an opposing direction of the safety valve and the opposing member and a stacking direction of the electrode assembly,
   the opposing member includes a projection arranged on a surface of the opposing member that is close to the conductor, at least a portion of the projection is located between the first conductor and the second conductor the second conductor is plate-shaped and includes a thick portion and a thin portion having different thicknesses, the thin portion and the second tab are welded, and a portion of the projection overlaps the thin portion as viewed from the opposing direction.

2. The electricity storage device according to claim 1, wherein the opposing member is insulative.

3. The electricity storage device according to claim 1, wherein the opposing member includes a groove at a location overlapping the safety valve as viewed from an opposing direction of the safety valve and the opposing member, the groove extends in a direction orthogonal to the opposing direction and includes an opening in at least one of two ends in the direction the groove extends, and the groove forms the gas flow passage.

4. The electricity storage device according to claim 3, wherein the groove has a bottom surface including a recess located at a position overlapping the safety valve as viewed from the opposing direction, and the recess is recessed from the bottom surface.

5. The electricity storage device according to claim 1, wherein the opposing member includes an exhaust port at a location overlapping the safety valve as viewed from the opposing direction of the safety valve and the opposing member, the exhaust port extends through the opposing member in the opposing direction, the conductor includes a communication aperture at a location overlapping the exhaust port as viewed from the opposing direction, and the communication aperture extends through the conductor in the opposing direction.

6. The electricity storage device according to claim 1, wherein the tabs are gathered at a first end side in a stacking direction of the electrode assembly, the gathered tabs are folded to extend toward a second end side opposite to the first end side, and the folded tabs are joined with the conductor;

the opposing member includes a main body and two extension pieces, the main body is arranged between the inner surface of the case and the conductor, and the two extension pieces extend from opposing side edges of the main body toward the electrode assembly and are located at two sides of the tabs in the stacking direction; and at least one of the extension pieces includes a holding piece that holds the tabs and the conductor with the main body in the opposing direction.

7. The electricity storage device according to claim 1, wherein the flow passage of gas has an area that is greater than an open area of the safety valve when the safety valve is open.

8. The electricity storage device according to claim 1, wherein the electricity storage device is a rechargeable battery.

9. The electricity storage device according to claim 3, wherein the opposing member has the form of a rectangular shape, and the groove extends in a short side direction of the opposing member.

10. The electricity storage device according to claim 3, wherein the projection projects toward the conductor, and the projection overlaps the groove as viewed from the opposing direction.

* * * * *